US012657186B1

(12) United States Patent
Nagarajan et al.

(10) Patent No.: US 12,657,186 B1
(45) Date of Patent: Jun. 16, 2026

(54) LARGE LANGUAGE MODEL (LLM) FOR AUTOMATED DATABASE QUERY RESOLUTION

(71) Applicant: Amazon Technologies, Inc., Seattle, WA (US)

(72) Inventors: Arunkalyan Thirumanilaiyur Nagarajan, Hyderabad (IN); Abhijeet Biswas, Hyderabad (IN); Rajashekar Reddy Mareddy, Hyderabad (IN); Saurabh Sachan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 18/742,794

(22) Filed: Jun. 13, 2024

(51) Int. Cl.
*G06F 16/2452* (2019.01)
*G06F 16/2453* (2019.01)
*G06F 16/2457* (2019.01)

(52) U.S. Cl.
CPC .. *G06F 16/24522* (2019.01); *G06F 16/24539* (2019.01); *G06F 16/24573* (2019.01)

(58) Field of Classification Search
CPC ......... G06F 16/24522; G06F 16/24539; G06F 16/24573
USPC .............................................................. 704/9
See application file for complete search history.

(56) References Cited

U.S. PATENT DOCUMENTS

| | | | | |
|---|---|---|---|---|
| 6,289,336 | B1 * | 9/2001 | Melton | .............. G06Q 30/0201 |
| | | | | 707/765 |
| 11,030,194 | B2 * | 6/2021 | Hrle | .................. G06F 16/24539 |

| | | | | |
|---|---|---|---|---|
| 12,147,758 | B1 * | 11/2024 | Thomas | .................. G06F 40/18 |
| 12,248,467 | B1 * | 3/2025 | Pendar | .................. G06F 16/243 |
| 12,306,828 | B1 * | 5/2025 | Chakraborty | ..... G06F 16/24522 |
| 12,524,403 | B2 * | 1/2026 | Barkan | ............. G06F 16/24522 |
| 2016/0034457 | A1 * | 2/2016 | Bradley | ............ G06F 16/24578 |
| | | | | 707/749 |
| 2016/0140123 | A1 * | 5/2016 | Chang | ............... G06F 16/24522 |
| | | | | 707/760 |
| 2018/0210821 | A1 * | 7/2018 | Raghavan | ........... G06F 11/3684 |
| 2018/0349377 | A1 * | 12/2018 | Verma | ............... G06F 16/24522 |
| 2019/0012347 | A1 * | 1/2019 | Fukui | ................ G06F 16/24539 |
| 2020/0301919 | A1 * | 9/2020 | Jin | ..................... G06F 16/90344 |
| 2021/0173888 | A1 * | 6/2021 | Flack | .................. G06F 16/9017 |
| 2021/0200761 | A1 * | 7/2021 | Li | ...................... G06F 16/24522 |
| 2022/0138170 | A1 * | 5/2022 | Misiewicz | ............... G06N 3/09 |
| | | | | 707/737 |

(Continued)

*Primary Examiner* — Thuykhanh Le
(74) *Attorney, Agent, or Firm* — Eversheds Sutherland (US) LLP

(57) ABSTRACT

A large language model (LLM) for automated database query resolution is provided. The LLM is configured to receive natural language prompts and generate database queries or direct answers to the prompts. To assist the LLM in generating the response, contextual information (e.g., historical queries, table metadata, etc.) may be captured, converted into embeddings, and stored in a vector database. When a natural language prompt is received, the prompt is also converted into an embedding and a nearest neighbor search may be performed to identify the most relevant contextual information. This most relevant information is then provided to the LLM. Additionally, one or more knowledge graphs may also be generated, with nodes representing tables and indications of relationships between the nodes being provided. These knowledge graphs may also be provided to the LLM.

20 Claims, 12 Drawing Sheets

(56)        References Cited

U.S. PATENT DOCUMENTS

| | | | |
|---|---|---|---|
| 2023/0070618 A1* | 3/2023 | Mishra | G06F 40/205 |
| 2023/0244670 A1* | 8/2023 | Dangoor | G06F 16/24526 |
| | | | 707/774 |
| 2023/0342356 A1* | 10/2023 | Singh | G06F 16/24542 |
| 2024/0362212 A1* | 10/2024 | Sun | G06F 16/24522 |
| 2024/0370434 A1* | 11/2024 | Venugopal | G06F 16/24539 |
| 2024/0403194 A1* | 12/2024 | Hawes | G06F 16/24522 |
| 2024/0403289 A1* | 12/2024 | Hawes | G06F 16/2455 |
| 2024/0419803 A1* | 12/2024 | Blum | G06F 21/577 |
| 2024/0419835 A1* | 12/2024 | Karlberg | G06F 16/3329 |
| 2025/0021548 A1* | 1/2025 | Petersen | G06F 16/24522 |
| 2025/0077511 A1* | 3/2025 | Zhao | G06F 16/252 |
| 2025/0086171 A1* | 3/2025 | Kunz | G06F 40/40 |
| 2025/0156413 A1* | 5/2025 | Barkan | G06F 40/295 |
| 2025/0165513 A1* | 5/2025 | Gudla | G06F 16/24522 |
| 2025/0173330 A1* | 5/2025 | Durg | G06F 16/243 |
| 2025/0209063 A1* | 6/2025 | Jellen | G06F 16/2322 |
| 2025/0228502 A1* | 7/2025 | Pydah | G06F 16/24522 |
| 2025/0252097 A1* | 8/2025 | Ng | G06F 16/24522 |
| 2025/0258814 A1* | 8/2025 | Tiwari | G06F 16/2438 |
| 2025/0259005 A1* | 8/2025 | Du | G06F 16/24522 |
| 2025/0265244 A1* | 8/2025 | Matusek | G06F 16/248 |
| 2025/0284698 A1* | 9/2025 | Perlov | G06F 16/3329 |
| 2025/0298816 A1* | 9/2025 | Hunter | G06F 16/383 |
| 2025/0328525 A1* | 10/2025 | Mishra | G06F 16/24522 |
| 2025/0335715 A1* | 10/2025 | Kumaresan | G06F 16/24522 |
| 2025/0348485 A1* | 11/2025 | Kulkarni | G06F 16/24542 |
| 2025/0363099 A1* | 11/2025 | Tishbi | G06F 16/24522 |
| 2025/0371041 A1* | 12/2025 | Yang | G06F 16/322 |

* cited by examiner

350

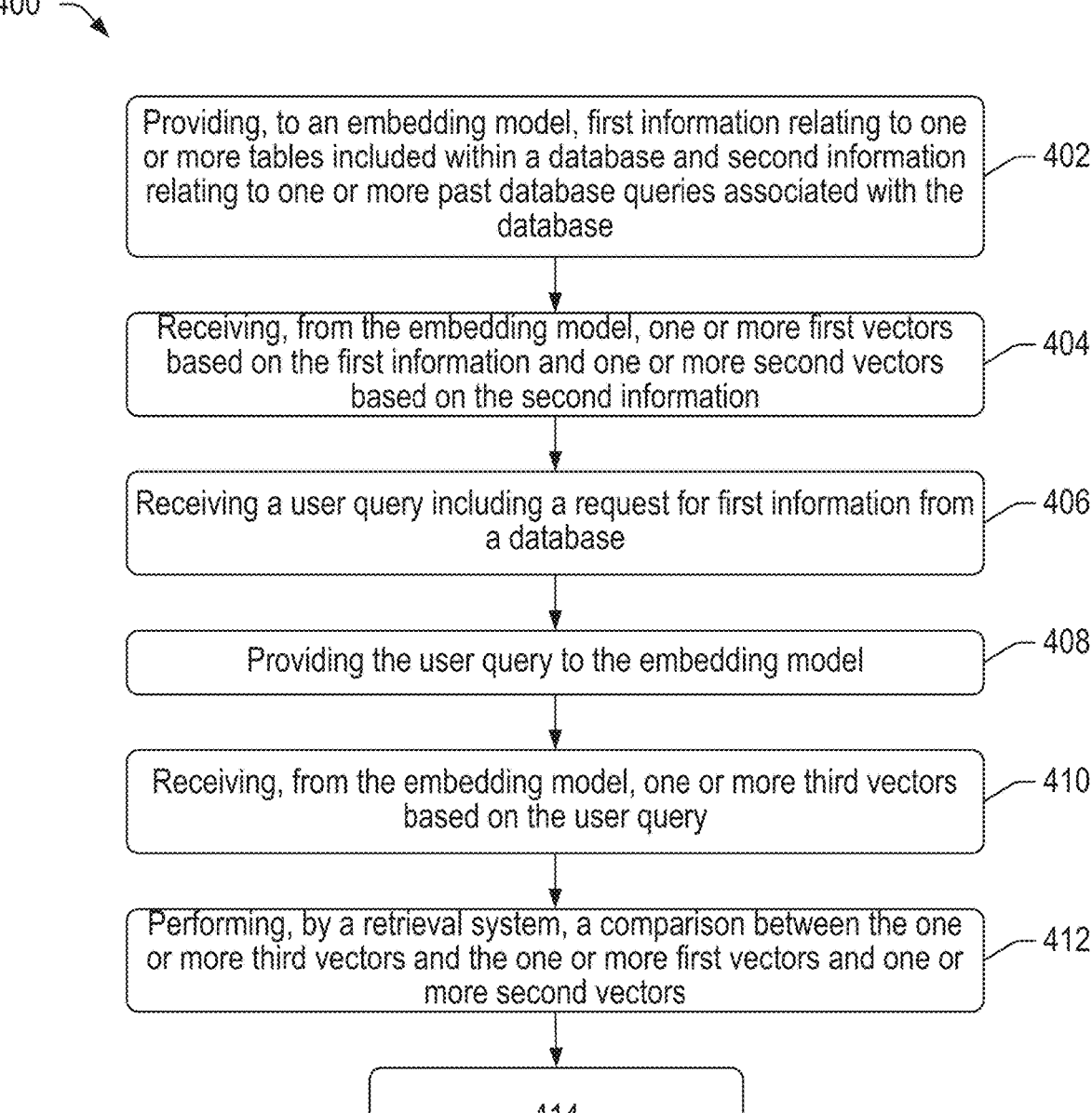

400

Providing, to an embedding model, first information relating to one or more tables included within a database and second information relating to one or more past database queries associated with the database — 402

Receiving, from the embedding model, one or more first vectors based on the first information and one or more second vectors based on the second information — 404

Receiving a user query including a request for first information from a database — 406

Providing the user query to the embedding model — 408

Receiving, from the embedding model, one or more third vectors based on the user query — 410

Performing, by a retrieval system, a comparison between the one or more third vectors and the one or more first vectors and one or more second vectors — 412

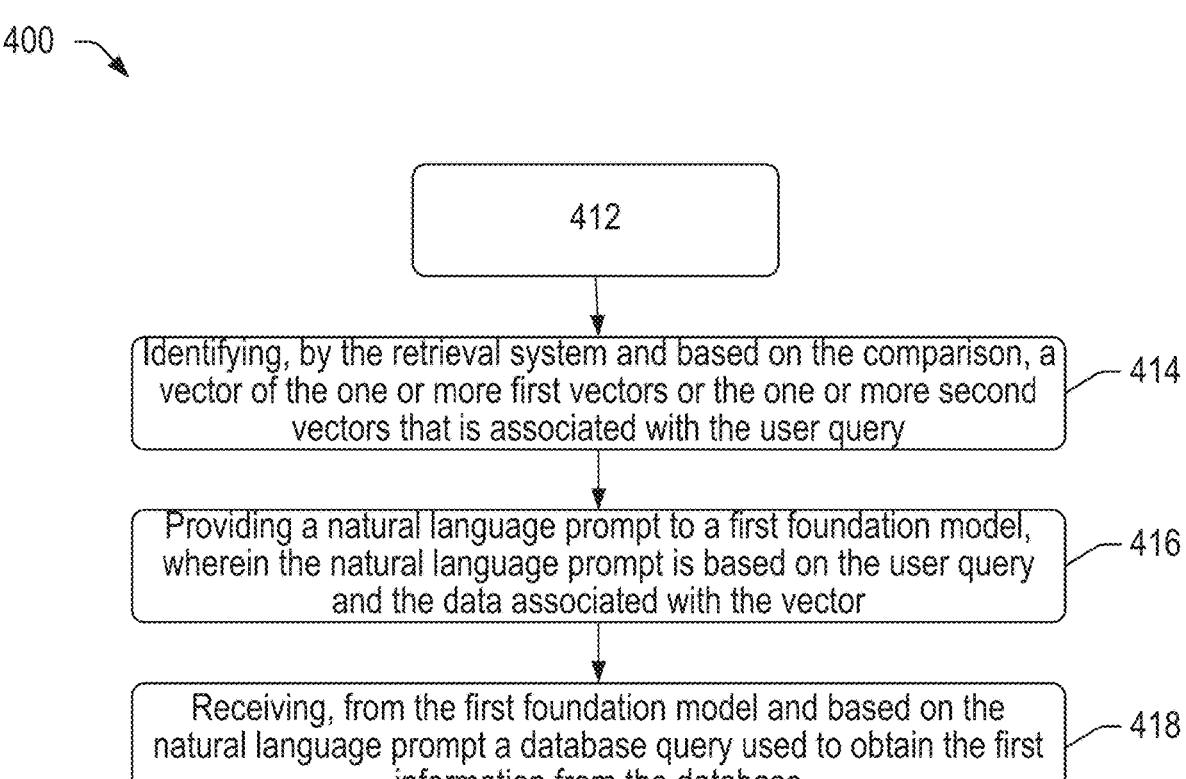

412

Identifying, by the retrieval system and based on the comparison, a vector of the one or more first vectors or the one or more second vectors that is associated with the user query — 414

Providing a natural language prompt to a first foundation model, wherein the natural language prompt is based on the user query and the data associated with the vector — 416

Receiving, from the first foundation model and based on the natural language prompt a database query used to obtain the first information from the database — 418

FIG. 4B

LARGE LANGUAGE MODEL (LLM) FOR AUTOMATED DATABASE QUERY RESOLUTION

BACKGROUND

Systems often rely heavily on access to accurate and relevant data to support critical processes and operational workflows. However, this data is often scattered across diverse data sources, including table metadata, wikis, documents, and collaborative platforms, presenting significant challenges in efficient data retrieval. Data retrieval from these heterogeneous data sources is a complex task, exacerbated by several factors. Examples of such factors may include: incomplete descriptions of tables and columns in database metadata, lack of context for structured query language (SQL) queries, domain-specific nuances in formulating SQL queries, identifying authoritative sources when information is duplicated across multiple sources, determining the appropriate level of data granularity for computationally efficient SQL queries, and accommodating evolving user behavior patterns in accessing different data sources.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIGS. 4A-4B depict a method for using a LLM for database query resolution, in accordance with one or more example embodiments of the disclosure.

DETAILED DESCRIPTION

Figure 1:
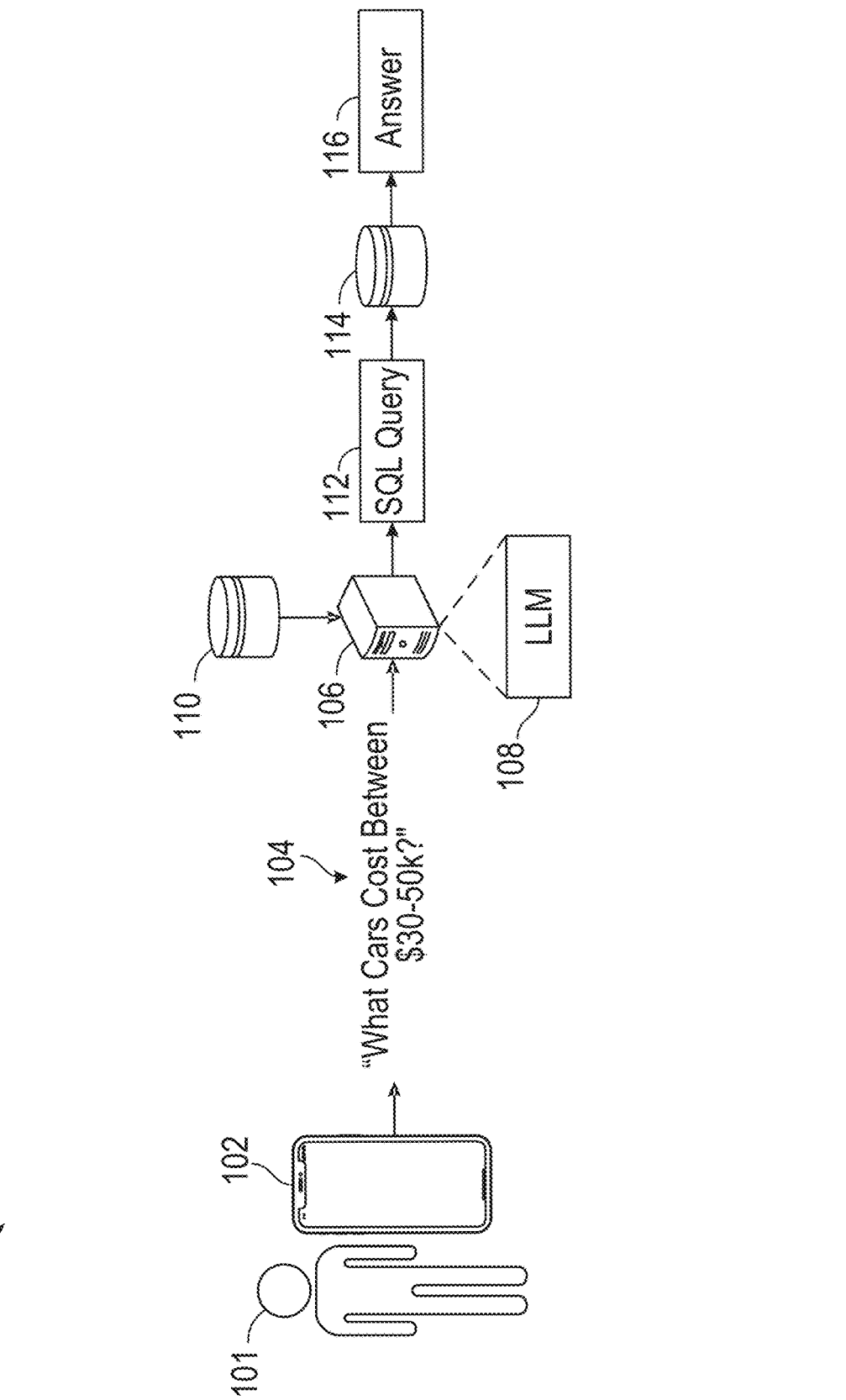
FIG. 1 depicts a use case for using a LLM for database query resolution, in accordance with one or more example embodiments of the disclosure.

This disclosure relates to, among other things, a system that leverages a large language model (LLM) for automated database query resolution. That is, an intelligent system is provided that leverages LLMs, advanced retrieval augmented generation (RAG), knowledge graphs, and user behavioral data to enhance automated data retrieval and SQL query generation. The system is configured to receive a user query requesting information included within a particular database (or an answer to a prompt that may be determined based on the information included in the database) as an input and generate a database query that may be used to obtain an answer to the prompt as an output. The database queries may be based on any number of query languages, such as SQL, Query by Example (QBE), XQuery, SPARQL, and/or any other types of database query languages (while specific reference is made hereinafter to SQL queries for consistency as an example, this is not intended to be limiting). In some instances, the output may be the answer itself rather than the database query that may be used to obtain the answer. For example, the system may generate the database query and automatically use the database query to obtain the answer to provide directly to the user who provided the prompt.

Particularly, a large language model (LLM) may be used to generate the database queries (or direct answers) based on the text-based prompts. For example, a user or a system may provide a prompt to the LLM requesting "sales data for the year 2021." The LLM may generate, based on this text-based prompt, a database query that may be used to obtain the requested information from tables in a database.

Additionally, in embodiments, the system may not necessarily be limited to managing a single user query but may also be configured to break down a larger request including multiple queries from a single or multiple users into smaller components. For example, the system may generate a plan for a given user query by breaking the user query down into smaller tasks and then executing each task by the LLM to generate the final answer.

This system provides at least the following improvements: (1) integration of user behavioral data, table usage patterns, table lineage into a "knowledge graph" to capture collective domain expertise for generating SQL queries for data using a LLM, (2) eliminating the need for fine-tuning LLMs or embedding models to accomplish these goals, (3) an approach for adjusting information granularity based on user query intent enabling efficient retrieval of authoritative sources at the appropriate level of detail, (4) an automated evaluation framework for assessing the system's performance of information retrieval and SQL query generation, (5) and a schema abstraction for reporting and dashboarding tools and guiding users to the most accurate dashboard by generating pre-filtered URLs.

With respect to dataset discoverability, the system utilizes table metadata, such as table and column descriptions, usage patterns, and frequently-executed SQL queries, to intelligently search and recommend relevant datasets matching user queries. That is, the system not only automatically generates the query or provides the direct answer, but also does so by navigating the database in an optimized manner to reduce latency and the computational cost required to obtain the query or direct answer. The system identifies authoritative sources when similar information is present across multiple sources, ensuring consistency. To compensate for limited metadata, the system may generate synthetic table descriptions and inject hypothetical questions using LLMs.

With respect to SQL generation, the system leverages Text-to-SQL capabilities of LLMs to generate SQL queries tailored to user data requirements. The system captures domain knowledge and business logic by constructing knowledge graphs based on frequently used SQL queries and tables, enabling the generation of high-quality SQL queries that accurately reflect domain expertise. Generating tailored queries may involve an in-depth understanding of processes and the intricate details that domain experts incorporate into their queries. For instance, when calculating revenue, canceled orders might have to be excluded, and appropriate partition filters, such as geographies, might have to be applied. Moreover, to gather relevant information from a given table, it may be critical to determine which additional tables need to be joined, the appropriate join keys, and the necessary filter conditions. The knowledge graphs constructed from frequently used SQL queries and tables in production capture the domain-specific nuances employed by subject matter experts, enabling the generation of SQL queries that accurately reflect domain expertise.

With respect to intent understanding, the system comprehends the intent behind user queries using few-shot learning techniques and employs appropriate workflows to retrieve relevant information from various sources, such as wikis, documents, and curated conversations. Intent may be identified using various types of approaches, such as using a few shot learning LLM or another machine learning model trained on intent labels.

With respect to granularity adjustment, the system may adjust the granularity of the retrieved information to match the desired level of detail specified in the user's query by learning embedding adapters and leveraging table lineage data. The same information can be stored at different granularity levels across various datasets. For example, order history data can be present at the customer-order level as well as aggregated daily, monthly, or trailing twelve months (TTM) order levels. Through the use of embedding adapters and table usage data mining, the system can retrieve information at the appropriate level of granularity based on the user's query. This results in generation of computationally efficient SQL queries.

With respect to automated evaluation, given that there may not be ground truth for the answers generated by the system, a systematic approach may be implemented to validate any outputs and evaluate the performance of the system. Additionally, the SQL queries that are generated may not only be evaluated to determine if they are correct based on the user queries but may also be evaluated to determine if they are optimal (for example, based on the configuration of the databases from which the answers to the user queries may be obtained, as well as other factors).

With respect to intelligent redirect to dashboard, the LLM has additional functionalities that streamline the process of generating URLs for dashboard tools based on natural language inputs. This solution aims to help users interact with data visualization platforms, making it more intuitive and efficient. The application's workflow begins by capturing all available dashboards and reports in their native storage formats and securely storing them.

To achieve this, two distinct components may be used. A first component involves dashboard and report identification. This component utilizes natural language understanding models to interpret the user's query and match the query with the most suitable dashboard or report from the schema repository. By leveraging the rich metadata and contextual information embedded within the files, the analytical resource that best addresses the user's needs may be accurately pinpointed. A second component involves URL Generation with pre-filtered parameters: once the relevant dashboard or report has been identified, this component examines the schema of the selected resource, extracting all available filters and parameters. By intelligently mapping the user's query to these filters, the system generates a tailored URL that incorporates the desired pre-filtered parameters. This ensures that the resulting dashboard or report is already customized to the user's specific requirements, eliminating the need for manual filtering and enhancing the overall user experience.

Turning to the figures, FIG. 1 depicts a use case 100 for using a LLM for database query resolution. In the use case 100, the user 101 may desire to obtain this information from a database 114 including information about a vehicle inventory but may not have the expertise required to write a query in a database query language to obtain the information from the database 114. Additionally, it may not be possible for the user 101 to manually compile the data by viewing the data in the database 114 given the potential amount of data that may be stored within the database 114. The user 101 also may not have direct access to the data in the database 114. Additionally, the data may be structured and/or labeled in a manner that is not intuitive for the user 101 to be able to understand what the data represents. For example, the table names may not necessarily be intuitive and instead may be more cryptic in nature.

To obtain the information the user desires 101 given these challenges, the user 101 begins by inputting a user query 104 into a device 102. The user query 104 may be provided to an application, such as a chat application, or via any other suitable mechanism. Although the device 102 is shown as a mobile device, such as a smartphone, any other type of device may also be used (for example, a desktop or laptop computer, tablet, any user device 502, etc.). The user query 104 in this case includes a question posed in natural language asking "What cars cost between $30-50k?"

Figure 2A:
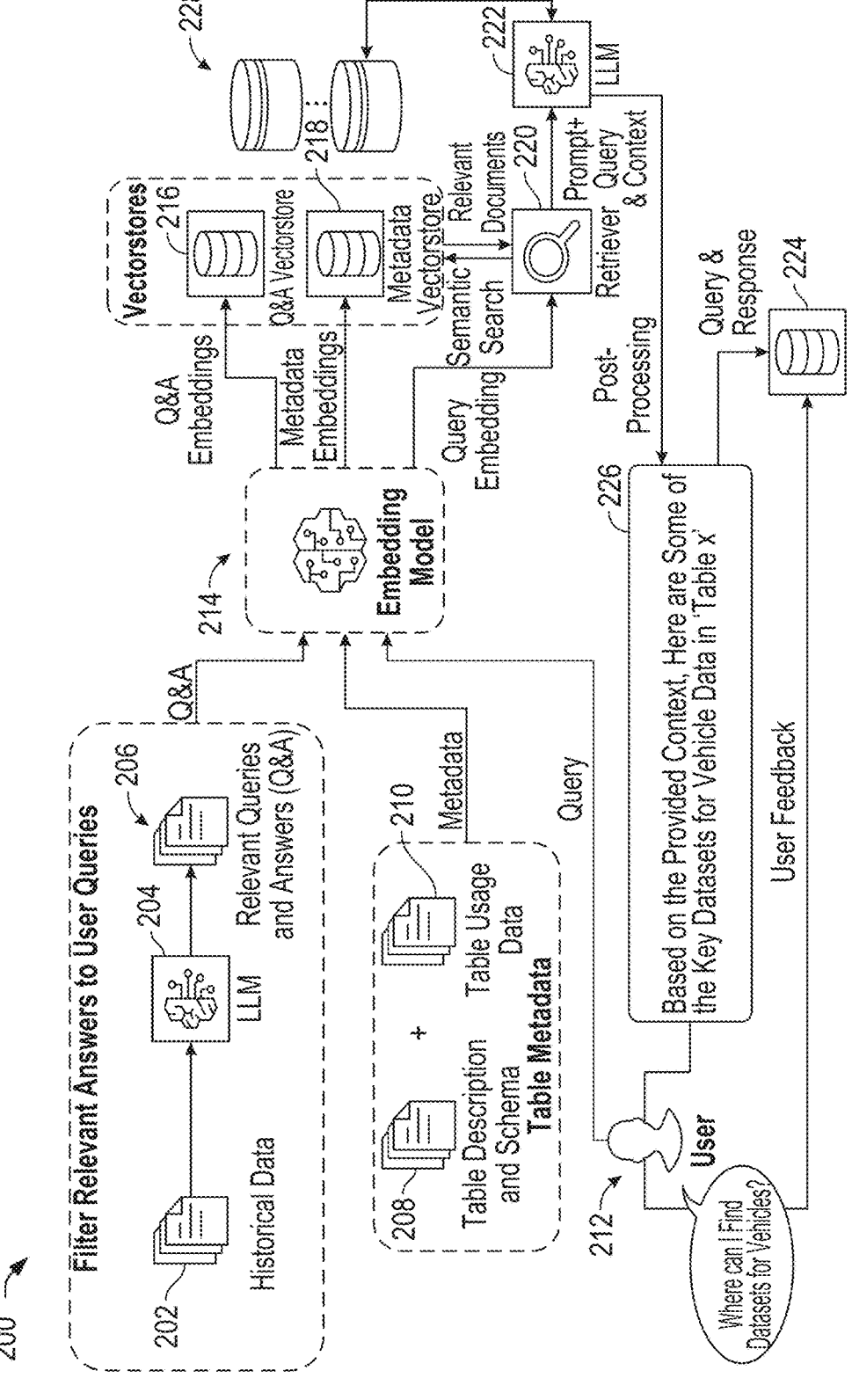
FIGS. 2A-2B depict flow diagrams for using a LLM for database query resolution, in accordance with one or more example embodiments of the disclosure.
Figure 2B:
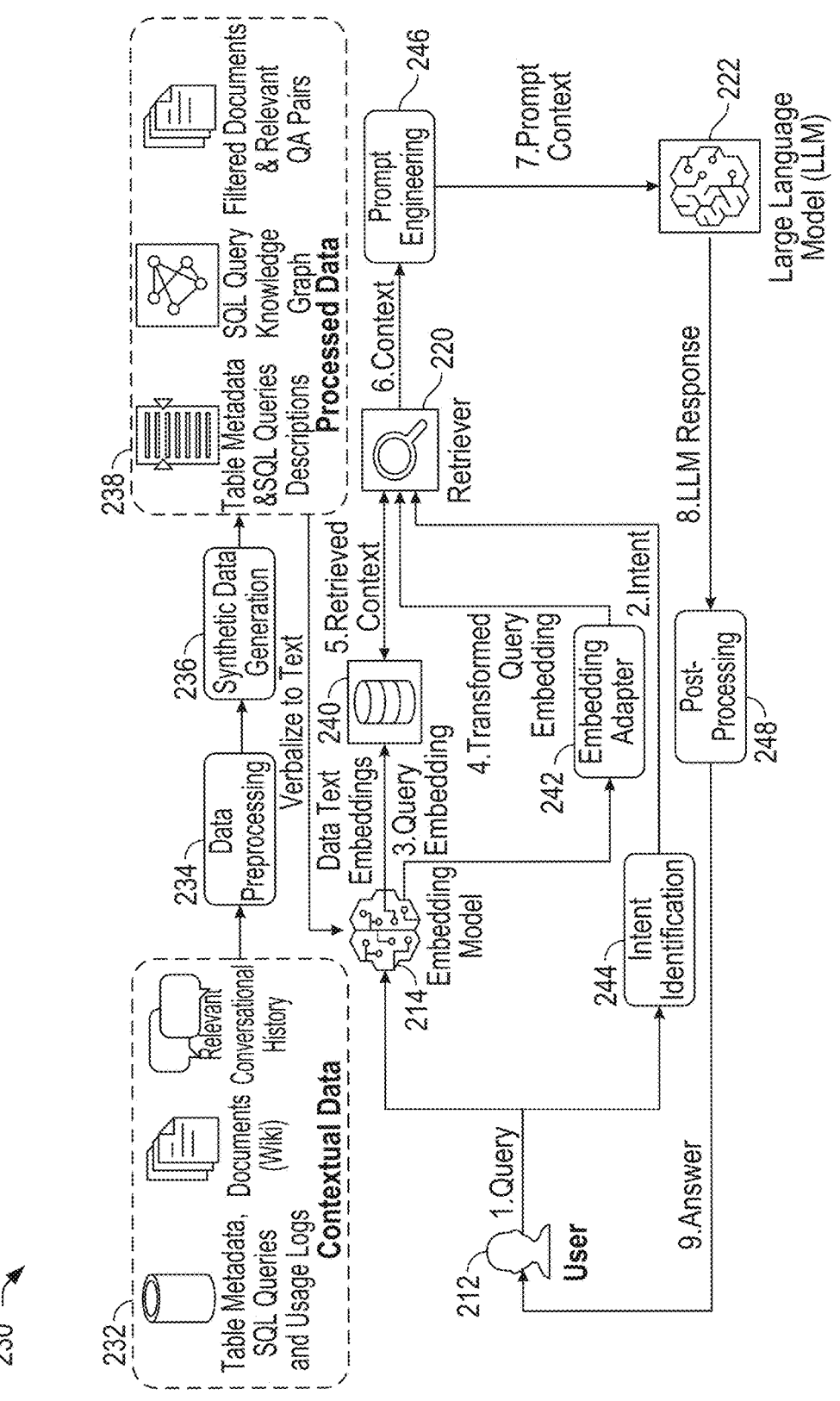

Once the user query 104 is received, the user query 104 is then provided to a system 106 including a LLM 108 (which may be the same as LLM 222 of FIGS. 2A-2B and/or any other LLM described herein). The LLM 108 is trained to, based on the user query 104, generate a database query in a database query language (shown as an SQL query 112 in FIG. 1, however, any other database query language may also be used) that may be used to obtain the desired data from the database 114. In this manner, the user is able to obtain the data from the database 114 without having to know the syntax of the database query language to generate the database query. Alternatively, the LLM 108 may generate the database query and the database query may be used to automatically obtain the answer 116 to the user query 104. In this manner, the answer 116 may be provided directly to the user 101 rather than only the database query being provided to the user 101, thereby requiring the user 101 to use the database query to obtain the answer from the database 110.

Although reference is made in the use case 100 to a user query 104 provided by a user 101, the user query may also be automatically generated by a system without manual intervention by a user as well. Additionally, while in some instances the user query 104 being a text prompt, any other type of input may be used to generate the text prompt. For example, the user may speak the same "what cars cost between $30k-$50k" question (for example, into a microphone of the user device 102 and the auditory input may then be converted into a text prompt that is then provided to the LLM 108.

Additionally, although the user case 100 only shows the user 101 providing a single input prompt to the system 106, this is not intended to be limiting. In some instances, the system 106 may iterate through a series of questions and responses with the user 101. For example, in response to the initial question "what cars cost between $30-50k," the system 106 may provide a question to the user 101 (via the device 102) asking "did you mean sedans or coupes?" or any other type of question. In this manner, the interactions between the user 101 and the LLM 108 may be more conversational rather than only being limited to a single input prompt by the user 101 followed by a single response from the system 106.

FIG. 2A depicts a flow diagram 200 for using a LLM for database query resolution. The flow diagram 200 illustrates some of the operations that may be performed in association with receiving a user query from a user 212 and outputting a corresponding database query (for example, an SQL query or any other type of database query) based on the user query (or generating the database query, determining an answer to the user query, and presented the answer to the user query to the user 212). The prompt may be a request for information that is included in one or more databases 228 (or a request for information that may otherwise be determined using the information in the one or more databases 228). Any reference herein to a prompt being received from a user 212 is not intended be limiting and a prompt may also be automatically received from a system, device, etc. without requiring manual user intervention.

Prior to a prompt being received (for example, a prompt provided by the user 212 or automatically provided by a system, device, etc.), the flow diagram 200 begins with contextual information being obtained and provided to an embedding model 214 to be converted into embeddings for storage. Thus, when the prompt is received, the most relevant of this stored contextual information may be retrieved from storage and provided to the LLM 222 as additional context that assists the LLM 222 in generating the appropriate database query (or answer) based on the prompt.

This contextual information may include, for example, historical data 202. That is, the contextual information may include information relating to any prompts that were provided by a user 212 (or automatically without manual user intervention) as well as the resulting database queries or direct answers that were produced based on the prompts. This historical data 202 may be obtained from any number of sources. For example, the historical data 202 may have been input via a website, application, and/or any other suitable mechanism. In some instances, a specific channel of a chat application may be established for purposes of providing answers to prompts and the historical data 202 may be retrieved from this channel as well.

In some instances, there may exist an abundance of historical data 202, however, some or all of the historical data 202 may not include an apt description explaining the purpose of the query. One approach to addressing this involves identifying the most relevant SQL queries based on usage frequency, broader usage, etc. For each of these most relevant queries, description generated may be crowd-sourced. Another approach involves using a LLM 204 to generate the description and use the generated description as seed information so more queries can be tagged with description.

The contextual information may also include information about some or all of the tables included in the one or more databases 228. For example, the contextual information may include table description and schema data 208, table usage data 210, and/or any other data that provides information about the tables in the one or more databases 228 and the contents of the tables. Table description data may include data providing details about columns included in the tables, the contents of the tables (e.g., column titles, cell values, etc.), and/or any other descriptive information about the tables. The table descriptions and schema data 208, for example, may be included within metadata associated with the tables. The contextual information may also include any other types of relevant information that may be useful as contextual information for the LLM 222.

This contextual information provides the further advantage of optimizing the process of generating the database query (or the answer) by providing context that is specific to the database including the data used to answer the prompt (for example, as illustrated in the use case 100 of FIG. 1, the prompt may be a natural language request for an answer that may be based on data included in the specific database(s) 228, rather than any database in general).

One challenge associated with obtaining this contextual information is that the dataset coverage may be limited, with table metadata only being available for a portion of the data (for example, only a portion of the tables from which table data (table descriptions, schema, etc.) is retrieved may include associated metadata). This challenge associated with limited metadata availability may be mitigated in a number of different ways.

As a first solution, one or more LLMs (or other types of models) may be leveraged to generate table descriptions for the tables that do not already include such descriptions. These table descriptions, for example, may be generated by the LLMs based on other information associated with the table that is available, such as the contents of the table, the schema of the table, etc. The descriptions may also be generated using external information, such as wiki information and/or any other types of information. That is, the system leverages the rich knowledge of LLMs learned from pre-training or reinforcement learning with feedback to generate table summaries, including column descriptions, table descriptions, target users, potential use cases for the data, potential security vulnerabilities such as personally identifiable information (PII), and other types of outputs. The system may leverage separate large language model prompts to generate outputs for each of the different types of outputs by using a sequential procedure. For instance, the column descriptions may be generated first by jointly passing the table information, such as the table name and schema (for example, list of column names and their data types, etc.) to the large language model. Metadata for the table may also optionally be provided. The obtained column descriptions may then be used in conjunction with the table schema and metadata (if provided) to obtain table descriptions.

The generated table descriptions may then be provided along with another prompt (and also the original input information) back to the LLM to produce the second output (for example, the column descriptions). This approach provides the technical benefit of addressing scenarios where the number of columns included in the table is greater than the maximum number of tokens in an output of the large language model, which allows for more effective batching. However, all of the table information may be generated by a single LLM based on a single prompt as well (or based on any other number of LLMs in series or parallel).

The prompts for each stage may also be adaptively optimized to tables from different domains (for example, finance, medicine, etc.). Additionally, the descriptions for each section may be refined using the obtained information for subsequent sections. These iterations serve as a mechanism that provides technical benefits, such as reducing noise, improving coverage of necessary information, etc. in the descriptions as it converges.

As another solution, the system may identify other sources of information to expand the coverage of the table description. For example, information included in a "wiki" or another similar types of data sources may include information about the tables that may be used to generate the table descriptions. This information included in the wikis or other type of data sources may be summarized by a LLM or another type of model or algorithm. As yet another solution, the context in which the table has been used may be used to guess the table descriptions.

A further step in obtaining this contextual information may include pre-processing of the contextual data. That is, another related technical improvement is that the LLM may be able to identify relevant tables and data entries within those tables even if the column names, data entries, or other types of table contents are not readily ascertainable. For example, certain column names may include abbreviations or otherwise incomprehensible information that a user or even a system may not understand without the appropriate contextual information. However, the large language model may be able to determine that these column names are relevant to the user search request even if the column names do not exactly match the information in the query provided by the user. As one non-limiting example, if the user search query is for a turbocharged vehicle, the large language model may be able to ascertain that a column name in a table including "TT" may refer to a twin turbo vehicle that is relevant to the search query.

Additionally, the contextual information may be used to generate "knowledge graphs" that may also be provided as inputs to the embedding model 214. The knowledge graphs may include various nodes representing aspects of the contextual data, such as tables, wiki pages, etc. The knowledge graphs may also provide indications of relationships between different portions of the contextual data. For example, a knowledge graph may provide information about the contents of tables and the relationships between the tables. In embodiments, the knowledge graphs may include a lineage graph and a behavioral graph. However, any other types of knowledge graphs may also be created as well. Further details about these knowledge graphs and their uses are provided with respect to at least FIGS. 3A-3F.

In some instances the information in the knowledge graphs may be converted into text form before being provided to the embedding model 214. As an example, the text may indicate that a table including car models and a table including car prices are frequently joined by car model and manufacturing year. However, the knowledge graphs themselves may also be provided as inputs to the embedding model 214 without being converted into text format beforehand.

The information in the knowledge graph may also be converted into vectors by the embedding model 214. This may be accomplished in a number of different ways. For example, the embedding model 214 may convert the individual nodes in the knowledge graphs into vectors without regard for the structure of the knowledge graphs. However, in some cases, the embedding model 214 may generate the vectors while considering the structure of the graphs and the relationships between the nodes in the graphs.

Any of this aforementioned information (e.g., the contextual information, knowledge graphs, etc.) may be provided to the embedding model 214, which may then convert the input information into vector embeddings. For example, the embedding model 214 may be a transformer model, however, any other type of model may also be used to generate the vectors from the input data. A vector embedding (also generally referred to herein as a "vector" or an "embedding") is a numerical representation of data that provides meaning to the data that is more readily identifiable by a computing element, such as the LLM 222 (while reference is made herein to a LLM, this is not intended to be limiting and any other type of machine learning model may also be used). For example, the embedding model 214 may receive data in the form of text and may convert the text into vectors including numerical values that represent the information included in the text in a different format. Converting the data into this vector form before storage provides a data format that is more readily searchable when it is desired to find the data that is most relevant to provide as content to the LLM 222 given an input prompt. The numerical representation of the vector format is also more easily processed by the LLM 222.

The resulting vectors that are generated by the embedding model 214 may be stored within one or more vector databases. For example, a first vector database 216 may be maintained for storing vectors generated for the historical data 202 and a second vector database 218 may be maintained for storing vectors generated for table description and schema data 208 and the table usage data 210. However, this is merely exemplary and any other number of vector databases may be used, including a single vector database storing all of the generated vectors. As a non-limiting example, a third vector database may be provided to store additional types of information.

With this data stored in the vector database(s), when a user query is received from the user 212, the prompt may be provided to a retrieval system 220. The retrieval system 220 may be tasked with identifying relevant information that is stored in the vector database(s) to provide to the LLM 222 as context to assist the LLM 222 in generating a response for the user 212.

This prompt may be received from the user 212 in any number of different manners. For example, the user 212 may type the user query into a chat application in a channel that is designed for such prompts. The user 212 may also enter the prompt into any other application using any number of different types of devices (such as a desktop or laptop computer, tablet, smart televisions, etc.). The user 212 may also provide a verbal prompt to a device and the prompt may be converted into a text format before being provided to the embedding model 214. The prompt may also be provided in any other manner. Additionally, as aforementioned, the prompt may be an automated prompt that is provided by another system, device, etc. rather than a manual prompt provided by the user 212 (that is, this process described in FIGS. 2A-2B may be entirely automated and may not require any user intervention).

The prompt may specifically include a question or request for information that is stored within one or more databases 228 (or an answer that may be determined using the information in the one or more databases 228). In some instances, the prompt may be specifically directed towards information included in the one or more databases 228. However, in other instances, the prompt may be a general question or request for information and the LLM 222 (or another element of the system) may identify the specific database of the one or more databases 228 that is likely to include the information that may be used to respond to the prompt.

Prior to the query being provided to the retrieval system 220, the embedding model 214 may also convert the query into vector embeddings. By converting the query into vector embeddings, the prompt is provided in a format that allows for an easier comparison with the vectors stored in the vector database(s). The vector(s) generated for the prompt may be provided directly to the retrieval system 220 and/or may be stored in the vector database(s) as well.

Once the retrieval system 220 receives the vectors generated for the prompt by the embedding model 214, the retrieval system 220 may then perform a search to identify relevant information in the vector database(s). The search may involve performing a comparison between the vectors stored in the vector database(s) and the vector(s) generated for the prompt. The comparison may be performed to identify similarities between the vectors stored in the vector database(s) and the vector(s) generated for the prompt. For example, the comparison may involve determining a "distance" between some or all of the vectors in the vector database(s) and the vector(s) generated for the prompt. This allows the system to determine the relevant data stored in the vector database(s) that is most relevant to the prompt.

In certain embodiments, the comparison may specifically involve performing a nearest neighbor search within the vector database(s). A nearest neighbor search is an umbrella term that is associated with a number of different vector searching techniques, including, but not limited to, cosine similarity, Euclidean distance, Manhattan distance, Pearson correlation coefficient, Jaccard similarity, approximate nearest neighbor algorithms, locality-sensitive hashing, etc. However, any other type of vector comparison technique that may be used to identify similarities between the two different sets of vectors may also be used.

Cosine similarity measures the cosine of the angle between two vectors, providing a value between −1 and 1, where 1 indicates that the vectors are identical, and 0 indicates that the vectors are orthogonal (completely dissimilar). Euclidean distance calculates the straight-line distance between two vectors in the multi-dimensional space, with smaller distances indicating higher similarity. Manhattan distance (or City Block distance) measures the sum of the absolute differences between the corresponding elements of two vectors, providing a measure of dissimilarity. Pearson correlation coefficient measures the linear correlation between two vectors, providing a value between −1 and 1, where 1 indicates a perfect positive correlation, −1 indicates a perfect negative correlation, and 0 indicates no correlation. Jaccard similarity measures the similarity between two sets of vectors by calculating the ratio of the size of the intersection of the sets to the size of the union of the sets. Locality-sensitive hashing (LSH) involves hashing the vectors into buckets, such that vectors that are close in the original space are more likely to be hashed into the same bucket, enabling efficient approximate nearest neighbor searches. Approximate nearest neighbor algorithms, such as hierarchical navigable small world (HNSW) or Annoy, are designed to find approximate nearest neighbors efficiently, trading off some accuracy for significant speedups in high-dimensional spaces.

The results of the search by the retrieval system 220 may be a list of information that is deemed most relevant to the received prompt. The determination as to which of the information is deemed most relevant to be retrieved and provided as context may be determined in any number of different ways. For example, the retrieval system 220 may perform a ranking of vectors stored in the vector database(s) based on the search results and the data associated with a threshold number of the highest-ranking vectors of the vector database(s) may be retrieved by the retrieval system

220 to provide as context to the LLM 222. These rankings may be determined based on the relative distances of the various vectors stored in the vector database(s) and the vector(s) for the prompt. For example, as mentioned above, the Euclidean distance involves determining a distance between two vectors with smaller distances indicating higher similarity. Thus, if this type of search is employed by the retrieval system 220, then the vectors associated with the smallest distance values may be retrieved as the most relevant data to be used as context. Thus, the manner in which the rankings are determining may depend on the output produced by the type of search that is used. Maximum marginal relevance (MMR) may be used to obtain diverse data in the ranking, for example.

Once this relevant information is identified, the retrieval system 220 may then provide the prompt to the LLM 222 as an input. The retrieval system 220 may also provide the relevant information identified in the search as context to the LLM 222. Using this information, the LLM 222 may generate an output in the form of a database query that may be used to obtain an answer to the prompt. Alternatively, the LLM 222 may use the database query to obtain the answer to the prompt and may provide the answer back to the user 212 rather than providing the database query itself.

For example, if the database 228 includes information about baseball statistics, a user may input text-based prompt stating "Provide a list of all of the baseball players in the last year with a batting average over .250." The database query may be generated to determine, using the information in the database 228, the listing of baseball players with a batting average above .250. This listing may then be presented back to the user. This process may also not necessarily involve a user and may be an automated process (that is, the input may be automatically provided by another system as well).

In embodiments, the LLM 222 may specifically be a LLM, however, other types of machine learning models may also be used. LLMs have exhibited remarkable performance across various natural language processing tasks, including question-answering (QA) and text summarization. A large language model trained to generate concise, informative, and reliable summaries and highlights of information included within database tables. These summaries (and other information) may be generated by the large language model without requiring some or all of the data entries included within the table to be provided to the large language model (for example, the information included within the cells of the table). The large language model also includes self-verification functionality in the form of automatic hallucination mitigation and quality evaluation for the outputs generated by the large language model.

Additionally, a ground truth database 224 may also be maintained. The ground truth database 224 may include the query responses generated by the LLM 222, along with any feedback received from the user 212 regarding the accuracy of the response produced by the LLM 222. For example, after receiving the response from the LLM 222, the user 212 may provide an indication of the accuracy of the response relative to an expected response. This ground truth data may then be used to train the machine learning model to more effectively generate responses to the input queries. The ground truth data may also be used to determine the effectiveness of future iterations of the LLM 222. For example, a first LLM may be trained for use in place of an existing, second LLM. The first LLM and the second LLM may be provided the input queries that resulted in the responses stored in the ground truth database 224. The outputs produced by the first LLM and the second LLM may then be provided to the third LLM, which may use the ground truth data in the ground truth database 224. The third LLM may then analyze the responses produced by the first and second LLMs to determine the performance of the first LLM relative to the second LLM. While reference is made to LLMs, any other type of model may also be used.

FIG. 2B depicts another flow diagram 230 for using a LLM for database query resolution. The flow diagram 230 includes some similar elements as the flow diagram 200 of FIG. 2A (for example, the user 212, retrieval system 220, LLM 222, embedding model 214, vector database 240 (which may be the same as vector databases 216 and 218), etc.). The flow diagram 230 is a variation of the flow diagram 200 and illustrates some additional aspects of the process associated with using a LLM for database query resolution, as described herein.

The flow diagram 230 begins with retrieval of contextual data 232. The contextual data 232 may include any of the contextual data described with respect to FIG. 2A, as well as any other types of input data. That is, the data that is received may not necessarily be limited to only the examples of types of data shown in FIGS. 2A-2B.

After the contextual data 232 is retrieved, the contextual data 232 may be pre-processed at operation 234. Data pre-processing may involve several key steps to prepare the input corpus for the LLM 222 using retrieval-augmented generation. One example of this pre-processing may include removing personal identifiable information (PII) and other sensitive information from the input data such that the sensitive information is not used by the LLM 222. Another example of this pre-processing may include filtering out documents and other information sources that only include minimal relevant text. Data de-duplication may also be performed using techniques like MinHash (or any other technique) for efficient retrieval. Further, relevant question-answer pairs may be extracted from prior chat conversations in channel designed for database queries by leveraging one or more machine learning models (for example, LLMs or other types of machine learning models) to identify user queries and corresponding answers, capturing esoteric domain knowledge.

In many cases, readily available table metadata and SQL descriptions are scarce, posing challenges for efficient data retrieval. Accordingly, operation 236 involves generation of synthetic data that may be used to supplement the existing data. For example, a LLM or other type of natural language processing model (or any other model in general) may be trained to generate synthetic (model-generated) data including synthetic SQL query and table descriptions (among other types of information). For example, the synthetic data may include table metadata, SQL query descriptions, and hypothetical questions, however any other types of synthetic data may also be generated.

The comprehensive table-level descriptions may be generated by exploiting contextual cues from table usage patterns, table lineage, column names, distinct column values with low cardinality, and existing populated descriptions. By conditioning the language model on this rich context, the model may capture the semantics and generate relevant, high-quality table descriptions.

With respect to SQL query descriptions, to improve the alignment and facilitate the discovery of relevant SQL queries based on user queries, SQL query descriptions instead of raw SQL may be leveraged, as their embeddings may be more aligned with natural language queries. Leveraging the zero-shot capabilities of LLMs, natural language descriptions may be generated for SQL queries. Any available information, such as existing SQL descriptions and metadata of tables used in the query may be provided. At the granular level, the LLM generates descriptions for individual components of the SQL query, such as the creation of temporary tables, subqueries, or specific data transformations. At overall level, the LLM generates a description that summarizes the high-level objective and logic of the entire SQL query.

Hypothetical questions may be synthetically generated questions that are semantically related to the original user query and the target answer. These hypothetical questions serve as additional context to guide the embedding adaptation process, providing valuable signal for aligning the query and answer representations. For each content item, multiple hypothetical questions may be generated based on user question patterns to increase alignment with the authoritative documents.

As mentioned with respect to FIG. 2A, to incorporate domain knowledge in generating efficient SQL queries for a given natural language query, one or more "knowledge graphs" (knowledge graph) may be constructed from frequently executed SQL queries. A knowledge graph may be defined as (E, R, T), where E is the set of entities and R is the set of relations. T is the collection of fact triples {(eh, r, et)}∈E×R×E, where eh denotes the head entity, r is the relation along with metadata, and et indicates the tail entity. The knowledge graphs serve as a repository of domain-specific knowledge, encapsulating expertise such as commonly applied filters, frequently joined tables, and join conditions. By leveraging this domain knowledge, the quality and performance of the generated SQL queries is enhanced.

The construction of the knowledge graph may involve data collection, knowledge extraction, and graph construction. With data collection, a representative set of frequently executed SQL queries may be extracted from the production environment and query logs. These queries may be assumed to be optimized for performance and reflect the domain-specific practices and conventions. For each of these queries, the description at overall level and also at sub-query query level may be generated.

With knowledge extraction, the zero-shot capability of a LLM may be leveraged to parse and extract relevant knowledge from the collected SQL queries. To aid the LLM in understanding the context and intent behind each SQL query, a description of the query's objective in addition to the raw SQL code may be provided to the LLM. The LLM may be instructed to identify tables as nodes and joining conditions with associated identifiers (IDs) as edges (relationships) in the knowledge graph. Furthermore, the LLM may generate a descriptive metadata for each edge, capturing the semantic relationship between the connected nodes.

With graph construction, the collection of triplets, i.e. extracted knowledge entities (tables as nodes) and their relationships (joining conditions and IDs as edges), form the knowledge graph. The graph's topology captures the intrinsic connections and dependencies among the various components of the SQL queries, while the edge metadata provides semantic annotations for the relationships. The constructed knowledge graph is leveraged during the SQL query generation process.

During the SQL query generation process, the knowledge graph and the LLM may be leveraged in a two-step retrieval process. First, table identification may be performed. Given a natural language query, embeddings may be generated from the query and the node (e.g., table) metadata in the knowledge graph. Using semantic search techniques, the most relevant tables that can potentially contribute to answering the query may be identified. A focused search on the edges associated with these relevant tables may then be performed and the top two most relevant triplets (node-edge-node) may be selected. Second, triplet expansion may be performed. In the second step, the search may be expanded to include all triplets in the Knowledge Graph. Embeddings may be generated for the edges using both the parsed information (such as table names, join conditions, and filter conditions) and the generated descriptions from the LLM. To incorporate the parsed information, the output may be verbalized and concatenated with the generated description before creating the embeddings. A semantic search may then be performed to retrieve the top two most relevant triplets that were not selected in the first step.

For SQL query generation, the selected triplets, table metadata, and example SQL queries may be provided to the LLM 222 as inputs. The LLM 222 leverages this domain knowledge encoded in the knowledge graph to generate a SQL query that adheres to the best practices and conventions within the specific domain. By incorporating the domain knowledge from the knowledge graph and employing a two-step retrieval process, the generated SQL queries become more efficient. This approach not only enhances query performance but also ensures consistency and alignment with the established practices, ultimately improving the overall quality of the generated SQL queries.

An embedding adapter 242 may be leveraged to better align the representations of user queries and potential answer candidates, thereby enhancing the system's ability to retrieve the relevant information. The embedding adapter 242 may be neural network modules that can be seamlessly integrated into pre-trained embedding models. The embedding adapter 242 is designed to translate the embeddings using transformations (such as Affine transformations, as a non-limiting example), tailoring the embeddings to the specific task of aligning user queries with relevant answers. By learning appropriate transformations, the adapters can also align the embeddings of queries with answer candidates at different levels of granularity, ensuring that the retrieved information matches the desired level of detail specified in the query. Incorporating embedding adapters into pre-trained language models leads to substantial improvements in question-answering performance, as measured by standard metrics.

In embodiments, a linear network may be employed to work as the embedding adapter 242 for any underlying sentence embedding model. For a given embedding e, the embedding adapter 242 may translate the embedding to e', where e'=W*e+b. Here, W and b are parameters of the model to be learned. is a lightweight and computationally efficient solution that can be seamlessly integrated into existing sentence embedding models.

The embedding adapter 242 may be trained using contrastive loss, for which positive and negative question-answer pairs may be created. These pairs may be generated from the table descriptions. The hypothetically generated questions and the table descriptions present in the questions may be used as positive examples. For negative examples, a random sample from all available tables that are not present in the SQL may be performed. The positive examples, derived from the descriptions, represent semantically relevant pairs that the adapter should bring closer together in the embedding space. Conversely, the negative examples, randomly sampled represent unrelated pairs that the adapter should push apart.

Intent identification 244 may be used to address diverse user queries effectively. To do so, an intent classification model may be employed to selectively incorporate relevant data sources based on the query intent. For example, historical user queries may be classified based on different types of intents (non-limiting examples may include "SQL Generation," "Dataset Discovery," and "Knowledge Discovery") using LLMs. Subsequently, LLM prompts with curated intent datasets may be constructed as examples to generate variations of each query. This labeled data may then be used to train a BERT-based multi-class intent classification model (or other type of classification model). This approach balances providing sufficient context to the LLM and avoiding excessive input token count, optimizing computational resources.

Prompt engineering 246 involves generating, for each intent identified via the intent identification 244, tailored prompts to guide the response of the LLM 22. The prompts assign the LLM 222a role and provide intent-specific instructions. To enhance the LLM's 222 comprehension of contextual information, retrieved documents may be converted into a structured format using XML tags, aligning with the training methodology of models, such as Anthropic Claude. Designated "source" tags enable accurate citation. The final prompt seamlessly combines the assigned role, instructions, formatted context, and the original query to facilitate accurate and relevant responses from the LLM 222.

FIGS. 3A-3F depict examples of various types of knowledge graphs that may be employed by the machine learning model in generating responses to user queries. The knowledge graphs may include, for example, lineage graphs, behavioral graphs, edge aggregation, etc.

Figure 3A:
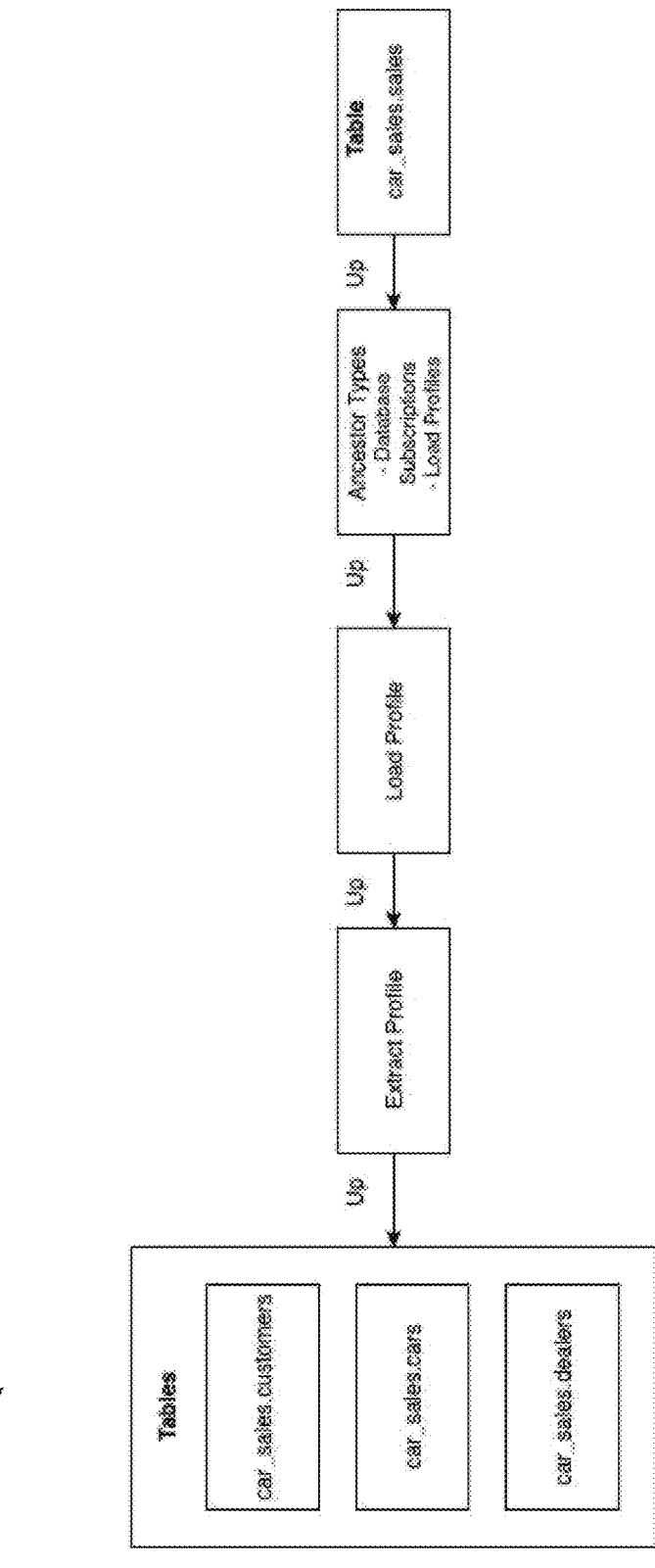
FIGS. 3A-3F depict examples of knowledge graphs, in accordance with one or more example embodiments of the disclosure.
Figure 3B:
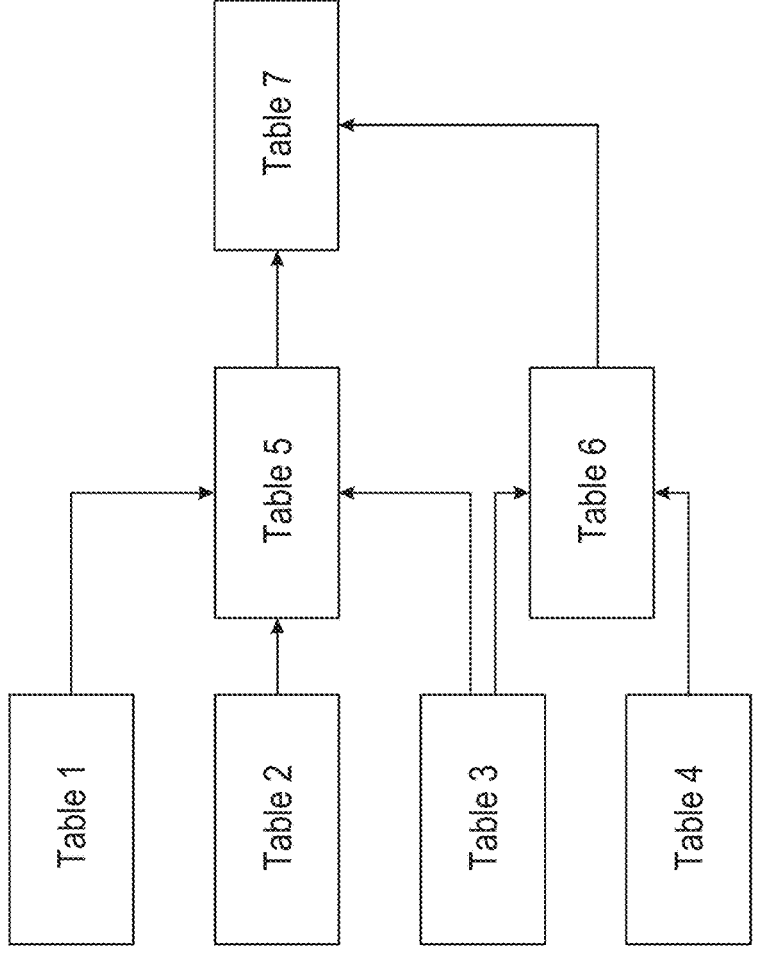

Beginning with FIGS. 3A-3B, examples of lineage graphs (for example, lineage graph 300 and lineage graph 310) are shown. The lineage graphs provide information about the tables that make up other tables, as well as information about the level of granularity of the data includes in the tables. The lineage graphs capture the provenance or lineage information of tables in the database. The lineage graphs represent the relationships between tables, such as derivation, transformation, or dependency. This lineage information is crucial for understanding the origins, evolution, and dependencies of data within the knowledge graph. The lineage dataset may be modeled as a directed acyclic graph (DAG), for example, where nodes represent tables, and edges represent the lineage relationships between them.

This information is beneficial because it is desirable to access the smallest possible table that includes the information that is to be leveraged to answer the user query. While the answer may be included in multiple tables, some of the tables may be larger and include more information than others and thus may be associated with increased computational costs and processing time, which introduces latency into the process. Therefore, the lineage graphs allow for the smallest tables with the least amount of granularity to be accessed first to determine if the desired information is included in those tables. If the information is included in those tables, then the information may be pulled from those tables to reduce computational costs and latency. If the information is not within those tables, then the system may continue through the lineage to larger tables with more granular information.

Figure 3C:
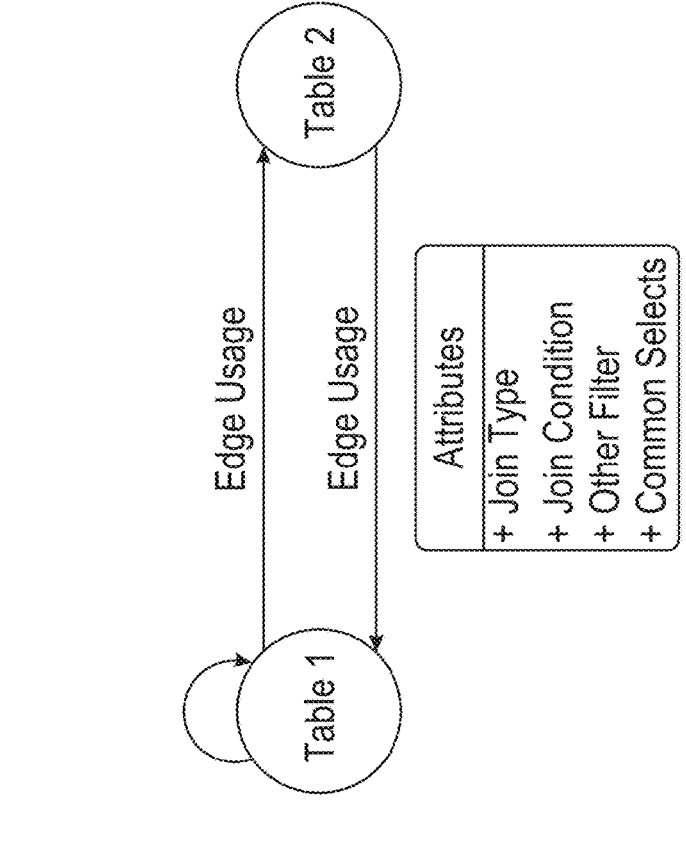

FIG. 3C depicts an example behavioral graph 320. This behavioral graph 320 serves to capture the relationships between tables based on their usage patterns in prior SQL queries. In addition to joins, filters, and join types, the behavioral graph 320 may also consider other SQL constructs, such as subqueries, unions, and derived tables, for example. The behavioral graph 320 may represent tables as nodes and their relationships (based on SQL usage-joins, filters, etc.) as edges. This dataset may provide insights into the actual usage patterns of tables and their interdependencies within the context of data analysis and reporting.

Figures 3D, 3E:
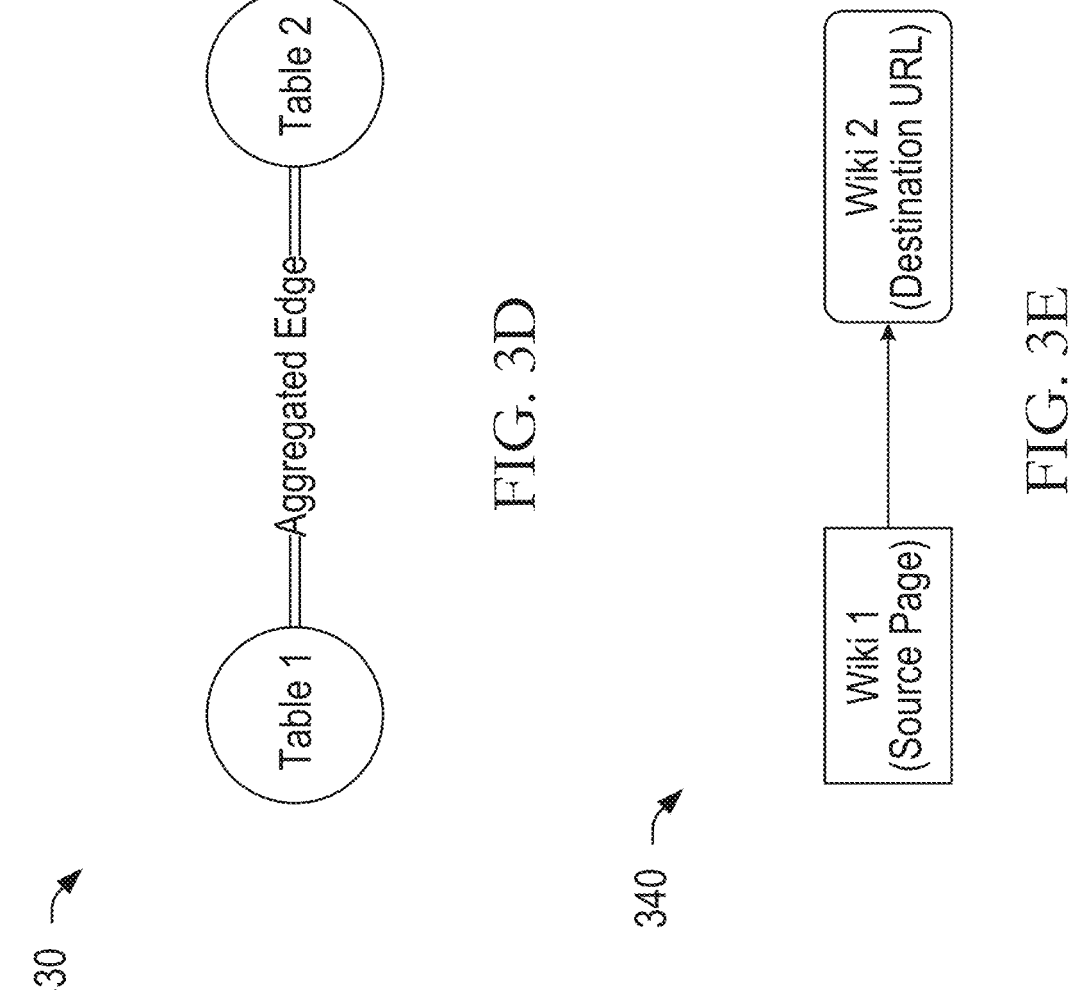

FIG. 3D depicts edge aggregation associated with the behavioral graph 320. This step involves aggregating and combining the individual edges from the behavioral graph data to create a consolidated view of the relationships between tables. The edge weights may be calculated based on the frequency of occurrence in SQL queries or other relevant metrics. This aggregated graph provides a higher-level view of the table relationships, enabling better knowledge representation and reasoning at a broader level.

FIG. 3E depicts an example of a cross source graph 340. This cross-source graph 340 may integrate information from various sources, such as wikis, documentation repositories, and other relevant data sources. The vector databases can provide semantic relationship between documents, however many documents reference other wiki documents which are also related wiki information that can be used for LLM retrievals.

Figure 3F:
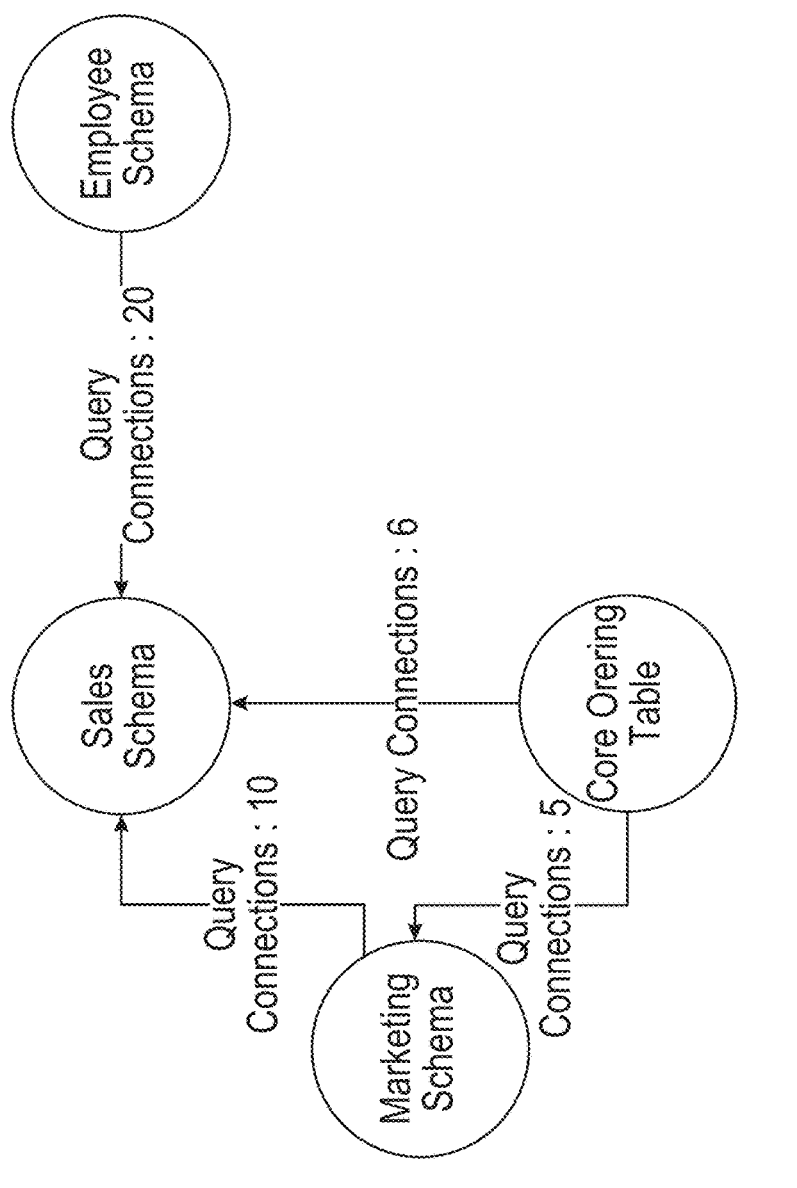

FIG. 3F depicts an example of a schema relationship graph 350. The schema relationship graph 350 leverages the observation that data teams often work with a subset of schemas and tables within the data warehouse. By identifying the frequently used schemas and tables, you can create a filtered or prioritized view of the Knowledge Graph, potentially improving the performance and relevance of retrieval. This could be achieved by analyzying SQL query logs, user access patterns, or other usage metrics to identify the most relevant schemas and tables.

FIGS. 4A-4B depict an example method 400 for automated database query resolution using a LLM. Some or all of the blocks of the process flows or methods in this disclosure may be performed in a distributed manner across any number of devices or systems (for example, any element shown in FIGS. 2A-2B, user device 501, computing device 504, computing device 600, etc.). The operations of the method 400 may be optional and may be performed in a different order.

At block 402 of the method 400, computer-executable instructions stored on a memory of a system or device (for example, any element shown in FIGS. 2A-2B, user device 501, computing device 504, computing device 600, etc.) may be executed to provide, to an embedding model (for example, embedding model 214), first information relating to one or more tables included within a database and second information relating to one or more past database queries associated with the database. For example, the first information may include table metadata, such as table descriptions, such as column descriptions, descriptions of content in the tables, etc. (for example, table description and schema data 208), table usage data (for example, table usage data 210), and/or any other information about the tables.

At block 404 of the method 400, computer-executable instructions stored on a memory of a system or device may be executed to receive, from the embedding model, one or more first vectors based on the first information and one or more second vectors based on the second information. The one or more first vectors and the one or more second vectors may also be stored in one or more vector databases (for example, first vector database 216, second vector database 218, etc.).

At block 406 of the method 400, computer-executable instructions stored on a memory of a system or device may be executed to receive a user query including a request for third information from a database.

At block 408 of the method 400, computer-executable instructions stored on a memory of a system or device may be executed to provide the user query to the embedding model. At block 410 of the method 400, computer-executable instructions stored on a memory of a system or device may be executed to receive, from the embedding model, one or more third vectors based on the user query. That is, the user query may also be converted into embeddings.

At block 412 of the method 400, computer-executable instructions stored on a memory of a system or device may be executed to perform, by a retrieval system, a comparison between the one or more third vectors and the one or more first vectors and one or more second vectors. At block 414 of the method 400, computer-executable instructions stored on a memory of a system or device may be executed to identify, by the retrieval system and based on the comparison, a vector of the one or more first vectors or the one or more second vectors that is associated with the user query. Particularly, a nearest neighbor search may be performed to identify the contextual information stored in the vector database(s) that is most relevant to the user query.

At block 416 of the method 400, computer-executable instructions stored on a memory of a system or device may be executed to provide a natural language prompt to a first foundation model (which may be a LLM or any other type of foundation model), wherein the natural language prompt is based on the user query and the data associated with the vector. That is, once the contextual information that is most relevant to the natural language prompt is identified using the nearest neighbor search, this contextual information may be provided to the foundation model as context to assist the foundation model in generating a response based on the natural language prompt.

Depending upon the intent of the user query, a combination of table metadata, SQL queries, knowledge graph information, and historical queries may be provided. In some instances, vectors may be provided to the foundation model. However, in other instances, the vectors themselves may not necessarily be provided. Rather, the prompt is provided to foundation model in a text format, which may include instructions, contextual information and user query. The contextual information may be formatted to aid the foundation model in processing the information.

At block 418 of the method 400, computer-executable instructions stored on a memory of a system or device may be executed to receive, from the first LLM and based on the natural language prompt and the vector a database query used to obtain the third information from the database. The database query may be presented to the user via a user interface. For example, if the user query is provided via a chat, the database query may be provided back to the user via the chat application as well. Alternatively, the answer to the user query may be provided instead of the database query. That is, the LLM may generate the database query and the database query may be automatically used to obtain the information from the database that may be used to answer the user query.

Figure 5:
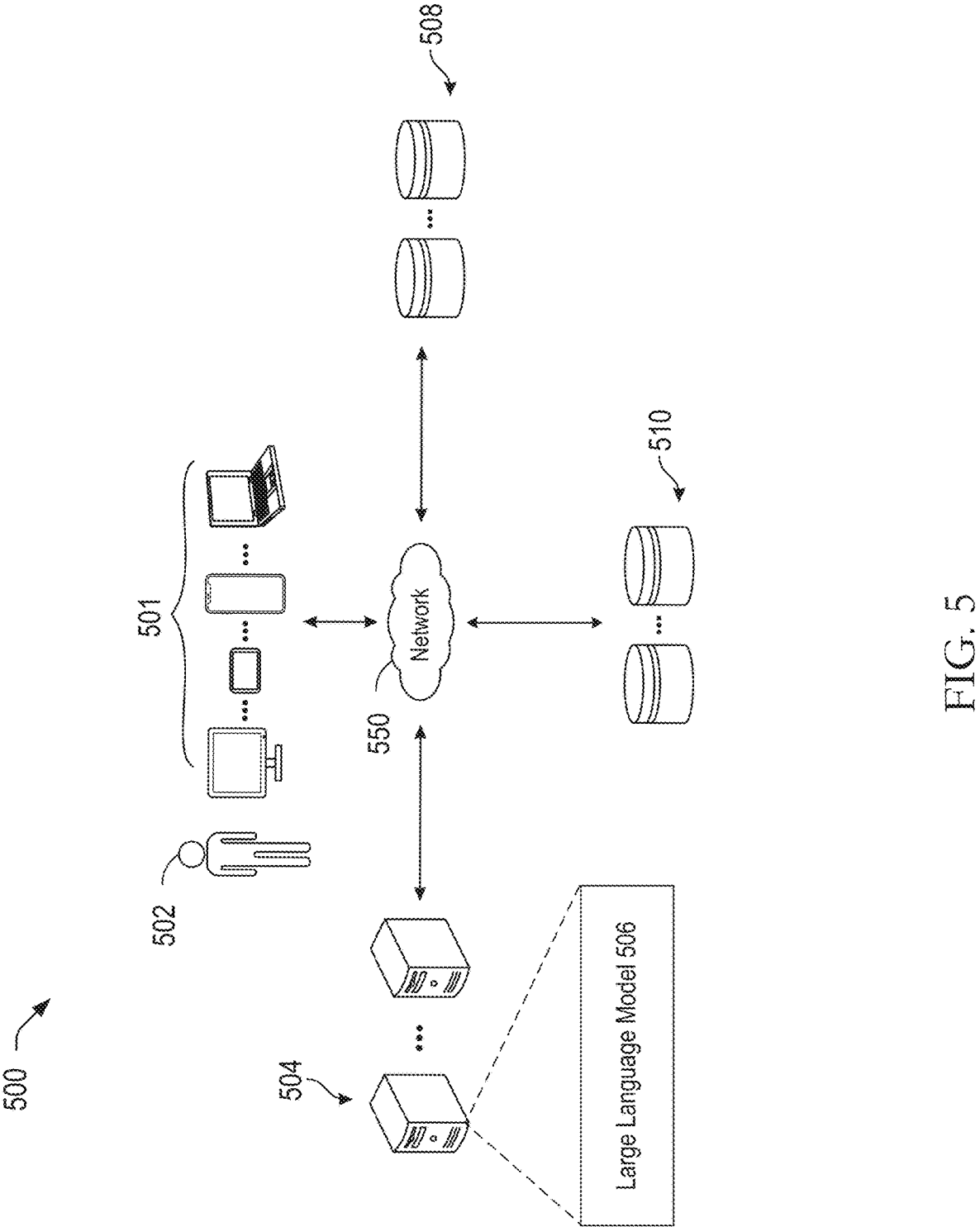
FIG. 5 depicts an example system for using a LLM for database query resolution, in accordance with one or more example embodiments of the disclosure.

FIG. 5 is an example system 500 for generating database queries from text prompts. In one or more embodiments, the system 500 may include one or more user devices 501 (which may be associated with one or more users 502), one or more computing devices 504, one or more first databases 508, and one or more second databases 510. However, these components of the system 500 are merely exemplary and are not intended to be limiting in any way. For simplicity, reference may be made hereinafter to a user device 501, computing device 504, databases 508 and 510, etc., however, this is not intended to be limiting and may still refer to any number of such elements.

The user device 501 may be any type of device, such as a smartphone, desktop computer, laptop computer, tablet, smart television (for example, a television with Internet connectivity, the capability to install applications, etc.), and/or any other type of device. The user device 501 may allow a user 502 to interact with any of the systems, devices, etc. to perform any number of different types of actions, such as providing a text-based prompt that may be processed by the LLM 506. For example, the user 502 may desire to obtain information included within the database 508.

The database 508 may include a large volume of information and it may not be practical for the user 502 to manually read all of the information in the database 508 to identify the specific information they desire. Further, in some cases, it may be difficult for the user 502 to identify the information even if they read all of the information in the database 508 if they are unaware of naming conventions for tables, columns, etc. Thus, database queries may be used to more efficiently obtain the information. These queries may be provided in a query language, such as SQL (or any other query language) that serve as a series of instructions that may be used to obtain certain information from the database 508.

However, the user 502 may not necessarily have the expertise to device the database query to obtain the information they desire. Instead, the user 502 may input a user query that is received by the LLM 506. The LLM 506 is configured generate a database query based on the user query such that the user 502 is able to obtain the information they desire without requiring the user 502 to device the database query themselves. The output of the LLM 506 may be the query or the information that the user seeks (that is, the database query may automatically be used to obtain the information rather than requiring the user to input the query to obtain the information themselves).

The computing device 504 may be any type of device (such as a local or remote server for example) used to perform any of the processing described herein. For example, the computing device 504 may host the LLM 506 that is used to generate the database queries based on text-based prompts received from the user device 501.

In embodiments, the LLM 506 may be a zero-shot model, a fine-tuned or domain-specific model, a language representation model, or any other type of LLM. While reference is made to the use of a LLM 506 herein, any suitable model other than a LLM may be used instead. Generally, a LLM is a type of generative model that uses deep learning techniques and large data sets to understand, summarize, generate, and predict content. A LLM is trained on a large volume of data. The training may be performed in any suitable manner, such as an unsupervised or supervised learning approach, to begin identifying relationships between different words and concepts. The LLM may also be trained and fine-tuned with a form of self-supervised learning. Subsequently, the LLM undertakes deep learning using a transformer model architecture that allows the LLM to understand and recognize the relationships and connections between words and concepts using a self-attention mechanism. That mechanism is able to assign a score, commonly referred to as a weight, to a given item (called a token) in order to determine the relationship. Once a LLM has been trained, the LLM may then be used to generate responses based on prompts, which could be an answer to a question, summarized text, etc. In this case, the response is an SQL query (or other type of database query).

As aforementioned, to further improve the accuracy of the output generated by the LLM 506, additional contextual information may be provided to the LLM 506 along with the text prompt. For example, this contextual information may include query hints based on past queries, as well as information about the contents of the database, such as information about tables in the data, information about columns in the tables, etc. This information may be received by the system from a database.

The first database 508 may store information that is the subject of the prompts provided to the LLM 506. For example, first database 508 may include sales data separated into tables for each calendar year. A user may provide a prompt to the LLM 506 requesting specific sales data from the first database 508. The sales data is merely one example of a type of data that may be maintained in the first database 508 and any other type of data may also be maintained in the database 508.

The second database 510 may include data that is provided to the LLM 506 along with the input prompt to generate the database query. For example, the database 510 may be the same as the vector database 216, vector database 218, etc. Additionally, in some instances, a single database or any other number of databases may maintain the information that is described as being maintained in the first database 508 and the second database 510.

In one or more embodiments, any of the elements of the system 500 (for example, one or more user devices 501, one or more computing devices 504, databases 508 and 510, and/or any other element described with respect to FIG. 5 or otherwise) may be configured to communicate via a communications network 550. The communications network 550 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 550 may have any suitable communication range associated therewith and may include, for example, global networks (e.g., the Internet), metropolitan area networks (MANs), wide area networks (WANs), local area networks (LANs), or personal area networks (PANs). In addition, communications network 550 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more user devices 501, one or more computing devices 504, and/or databases 508 and 510) of the system 500 may include any of the elements of the computing device 600 as well (such as the processor 602, memory 604, etc.).

Figure 6:
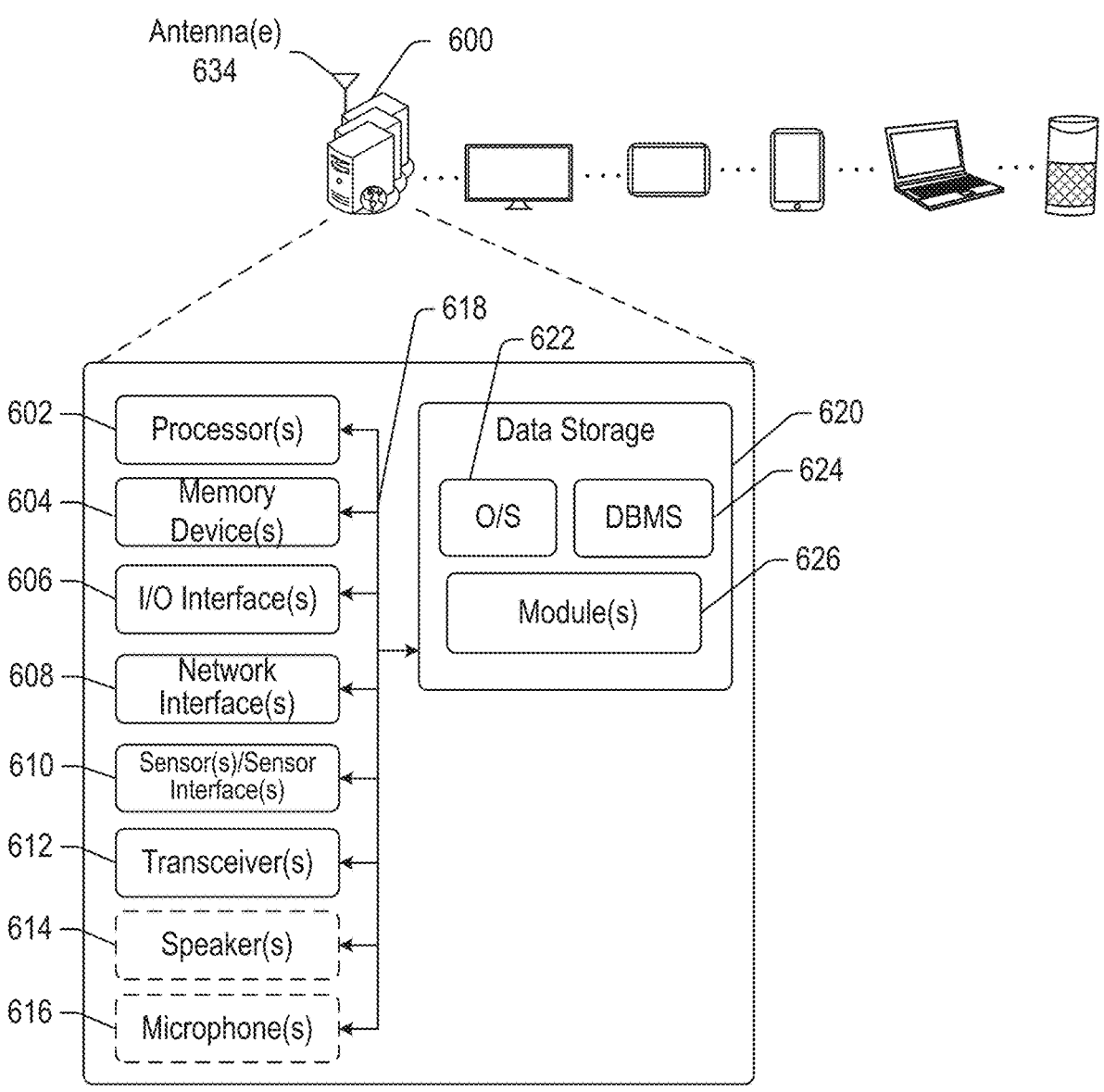
FIG. 6 depicts an example computing device, in accordance with one or more example embodiments of the disclosure.

FIG. 6 is a schematic block diagram of an illustrative computing device 600 in accordance with one or more example embodiments of the disclosure. The computing device 600 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 600 may correspond to an illustrative device configuration for the devices of FIGS. 1-5 (such as device 104, vehicle 136, device 138, user device 602, computing device 604, etc.).

The computing device 600 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The computing device 600 may further include one or more buses 618 that functionally couple various components of the computing device 600. The computing device 600 may further include one or more antenna (e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the computing device 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the computing device 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more module(s) 626. Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the computing device 600. Any data storage in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include pre-generated content data segments and/or summaries, data arrays including starting and stopping points and pointers to the content data segments and/or summaries, previously-generated recaps, etc.

The processor(s) 602 may be configured to access the memory 604 and execute computer-executable instructions loaded therein. For example, the processor(s) 602 may be configured to execute computer-executable instructions of the various program module(s), applications, engines, or the like of the computing device 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the module(s) 626 may include computer-executable instructions, code, or the like that responsive to execution by one or more of the processor(s) 602 may perform functions including, but not limited to generation of database queries and/or answers based on user queries, etc.

Referring now to other illustrative components depicted as being stored in the data storage 620, the O/S 622 may be loaded from the data storage 620 into the memory 604 and may provide an interface between other application software executing on the computing device 600 and hardware resources of the computing device 600. More specifically, the O/S 622 may include a set of computer-executable instructions for managing hardware resources of the computing device 600 and for providing common services to other application programs (e.g., managing memory allocation among various application programs). In certain example embodiments, the O/S 622 may control execution of the other program module(s) to dynamically enhance characters for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 600 is a user device, the DBMS 624 may be any suitable light-weight DBMS optimized for performance on a user device.

Referring now to other illustrative components of the computing device 600, the input/output (I/O) interface(s) 606 may facilitate the receipt of input information by the computing device 600 from one or more I/O devices as well as the output of information from the computing device 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna (e) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 600 may further include one or more network interface(s) 608 via which the computing device 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna (e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna (e) 634 may be communicatively coupled to one or more transceivers 612 or radio components to which or from which signals may be transmitted or received.

As previously described, the antenna (e) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 634 may be configured to transmit or receive radio frequency signals within any suitable frequency range forming part of the unlicensed portion of the radio spectrum.

The antenna (e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna (e) 634—transmitting or receiving radio frequency (RF) signals in the bandwidth and/or channels corresponding to the communications protocols utilized by the computing device 600 to communicate with other devices. The transceiver(s) 612 may include hardware, software, and/or firmware for modulating, transmitting, or receiving—potentially in cooperation with any of antenna (e) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the computing device 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionalities described as being supported by any of the program module(s) depicted in FIG. 6 may be implemented, at least partially, in hardware and/or firmware across any number of devices.

It should further be appreciated that the computing device 600 may include alternate and/or additional hardware, software, or firmware components beyond those described or depicted without departing from the scope of the disclosure. More particularly, it should be appreciated that software, firmware, or hardware components depicted as forming part of the computing device 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
providing, to an embedding model, first information from one or more tables included within a database and second information from one or more past database queries associated with the database;
receiving, from the embedding model, one or more first vectors based on the first information and one or more second vectors based on the second information;
storing the one or more first vectors and the one or more second vectors in one or more vector databases;
receiving a user query including a request for third information from the database;
providing the user query to the embedding model;
receiving, from the embedding model, one or more third vectors based on the user query;
performing, by a retrieval system, a nearest neighbor search involving the one or more third vectors and the one or more first vectors and one or more second vectors stored in the one or more vector databases;
identifying, by the retrieval system and based on the nearest neighbor search, a vector of the one or more first vectors or the one or more second vectors that is associated with the user query;
providing a natural language prompt to a first large language model (LLM), wherein the natural language prompt is based on the user query and a data associated with the vector; and
receiving, from the first LLM and based on the natural language prompt, a database query used to obtain the third information from the database.

2. The method of claim 1, further comprising:
generating one or more knowledge graphs including one or more nodes representing the one or more tables and relationships between the nodes; and providing the one or more knowledge graphs to the embedding model;

receiving, from the embedding model, one or more fourth vectors based on the one or more knowledge graphs; and providing the one or more fourth vectors or a data represented by the one or more knowledge graphs to a first foundation model to the first LLM.

3. The method of claim 2, wherein the one or more knowledge graphs include at least one of: a lineage graph or a behavioral graph.

4. The method of claim 1, wherein the first information includes at least one of: a table schema, a table name, a table description, a column type, cell contents, a column title, or table usage data.

5. A method comprising:

providing, to an embedding model, first information from one or more tables included within a database and second information from one or more past database queries associated with the database;

receiving, from the embedding model, one or more first vectors based on the first information and one or more second vectors based on the second information;

receiving a user query including a request for third information from the database;

providing the user query to the embedding model;

receiving, from the embedding model, one or more third vectors based on the user query;

performing, by a retrieval system, a comparison between the one or more third vectors and the one or more first vectors and one or more second vectors;

identifying, by the retrieval system and based on the comparison, a vector of the one or more first vectors or the one or more second vectors that is associated with the user query;

providing a natural language prompt to a first foundation model, wherein the natural language prompt is based on the user query and a data associated with the vector; and receiving, from the first foundation model and based on the natural language prompt, a database query used to obtain the third information from the database.

6. The method of claim 5, further comprising:

storing the one or more first vectors and the one or more second vectors in one or more vector databases, wherein performing the comparison further comprises performing a nearest neighbor search within the one or more vector databases.

7. The method of claim 5, further comprising:

generating one or more knowledge graphs including nodes representing the one or more tables and relationships between the nodes; and providing the one or more knowledge graphs to the embedding model;

receiving, from the embedding model, one or more fourth vectors based on the one or more knowledge graphs; and providing the one or more fourth vectors or a data represented by the one or more knowledge graphs to the first foundation model.

8. The method of claim 7, further comprising:

converting the one or more knowledge graphs into a text format prior to providing the one or more knowledge graphs to the embedding model.

9. The method of claim 7, wherein the one or more knowledge graphs include at least one of:

a lineage graph or a behavioral graph.

10. The method of claim 5, further comprising:

providing a prior prompt stored in a ground truth database to the first foundation model and a second foundation model, wherein the second foundation model was previously used to generate database queries;

receiving a first database query generated by the first foundation model based on the prior prompt and a second database query generated by the second foundation model based on the prior prompt;

providing the first database query and the second database query to a third foundation model; and determining, by the third foundation model and using a ground truth database query associated with the prior prompt, a performance of the first foundation model relative to the second foundation model based on the first database query and the second database query.

11. The method of claim 5, wherein the first information includes at least one of: a table schema, a table name, a table description, a column type, cell contents, a column title, or table usage data.

12. The method of claim 5, wherein the database query is formatted in a Structured Query Language (SQL).

13. A system comprising:

memory that stores computer-executable instructions; and one or more processors configured to access the memory and execute the computer-executable instructions to:

provide, to an embedding model, first information from one or more tables included within a database and second information from one or more past database queries associated with the database;

receive, from the embedding model, one or more first vectors based on the first information and one or more second vectors based on the second information;

receive a user query including a request for third information from the database;

provide the user query to the embedding model;

receive, from the embedding model, one or more third vectors based on the user query;

perform, by a retrieval system, a comparison between the one or more third vectors and the one or more first vectors and one or more second vectors;

identify, by the retrieval system and based on the comparison, a vector of the one or more first vectors or the one or more second vectors that is associated with the user query;

provide a natural language prompt to a first foundation model, wherein the natural language prompt is based on the user query and a data associated with the vector; and receive, from the first foundation model and based on the natural language prompt, a database query used to obtain the third information from the database.

14. The system of claim 13, wherein the one or more processors are further configured to execute the computer-executable instructions to:

store the one or more first vectors and the one or more second vectors in one or more vector databases, wherein performing the comparison further comprises performing a nearest neighbor search within the one or more vector databases.

15. The system of claim 13, wherein the one or more processors are further configured to execute the computer-executable instructions to:

generate one or more knowledge graphs including nodes representing the one or more tables and relationships between the nodes; and provide the one or more knowledge graphs to the embedding model;

receive, from the embedding model, one or more fourth vectors based on the one or more knowledge graphs; and provide the one or more fourth vectors or a data represented by the one or more knowledge graphs to the first foundation model.

16. The system of claim 15, wherein the one or more processors are further configured to execute the computer-executable instructions to:

convert the one or more knowledge graphs into a text format prior to providing the one or more knowledge graphs to the embedding model.

17. The system of claim 15, wherein the one or more knowledge graphs include at least one of: a lineage graph or a behavioral graph.

18. The system of claim 13, wherein the one or more processors are further configured to execute the computer-executable instructions to:

provide a prior prompt stored in a ground truth database to the first foundation model and a second foundation model, wherein the second foundation model was previously used to generate database queries;

receive a first database query generated by the first foundation model based on the prior prompt and a second database query generated by the second foundation model based on the prior prompt;

provide the first database query and the second database query to a third foundation model; and determine, by the third foundation model and using a ground truth database query associated with the prior prompt, a performance of the first foundation model relative to the second foundation model based on the first database query and the second database query.

19. The system of claim 13, wherein the first information includes at least one of: a table schema, a table name, a table description, a column type, cell contents, a column title, or table usage data.

20. The system of claim 13, wherein the database query is formatted in a Structured Query Language (SQL).

\* \* \* \* \*